US 7,450,250 B2

(12) United States Patent
Venkatesh et al.

(10) Patent No.: US 7,450,250 B2
(45) Date of Patent: Nov. 11, 2008

(54) METHOD AND APPARATUS FOR DETERMINING SURFACE DISPLACEMENT BASED ON AN IMAGE OF A RETROREFLECTOR ATTACHED TO THE SURFACE

(75) Inventors: Shalini Venkatesh, Santa Clara, CA (US); Richard Earl Haven, Sunnyvale, CA (US); John S. Wenstrand, Loveland, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 157 days.

(21) Appl. No.: 11/247,894

(22) Filed: Oct. 11, 2005

(65) Prior Publication Data
US 2006/0028656 A1    Feb. 9, 2006

Related U.S. Application Data

(63) Continuation-in-part of application No. 10/739,831, filed on Dec. 18, 2003, now Pat. No. 7,217,913.

(51) Int. Cl.
*G01B 11/14* (2006.01)
(52) U.S. Cl. ...................................... 356/620
(58) Field of Classification Search .................. 356/620
See application file for complete search history.

(56) References Cited
U.S. PATENT DOCUMENTS

| 4,631,676 | A | * | 12/1986 | Pugh | 600/595 |
|---|---|---|---|---|---|
| 4,980,626 | A | * | 12/1990 | Hess et al. | 318/568.16 |
| 5,235,416 | A | * | 8/1993 | Stanhope | 348/77 |
| 5,446,548 | A | * | 8/1995 | Gerig et al. | 356/620 |
| 5,812,266 | A | * | 9/1998 | Hercher | 356/620 |
| 6,055,080 | A | * | 4/2000 | Furstenau et al. | 398/139 |
| 6,621,889 | B1 | * | 9/2003 | Mostafavi | 378/65 |
| 7,205,521 | B2 | * | 4/2007 | Gruhlke et al. | 250/206.2 |

* cited by examiner

*Primary Examiner*—Tarifur R Chowdhury
*Assistant Examiner*—Tara S Pajoohi

(57) ABSTRACT

An imaging system and method are provided that use imaging information relating to positions of one or more retroreflectors attached to one or more surfaces of an object of interest to determine the shape and/or displacement of the surface or surfaces on which the retroreflector or retroreflectors are located. A variety of types of information may then be ascertained based on the determination as to the shape and/or displacement of the surface of the object, such as the value of some physiological parameter of a patient, internal and external pressure of an object, acoustical vibrations sensed by a microphone, positions of fingertips on a keyboard, etc.

22 Claims, 9 Drawing Sheets

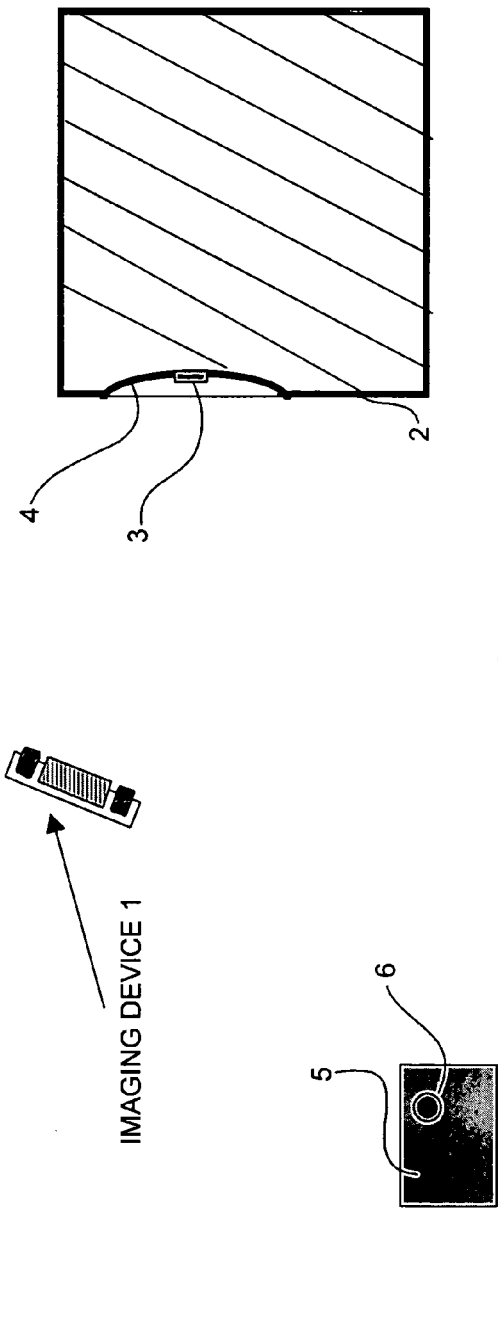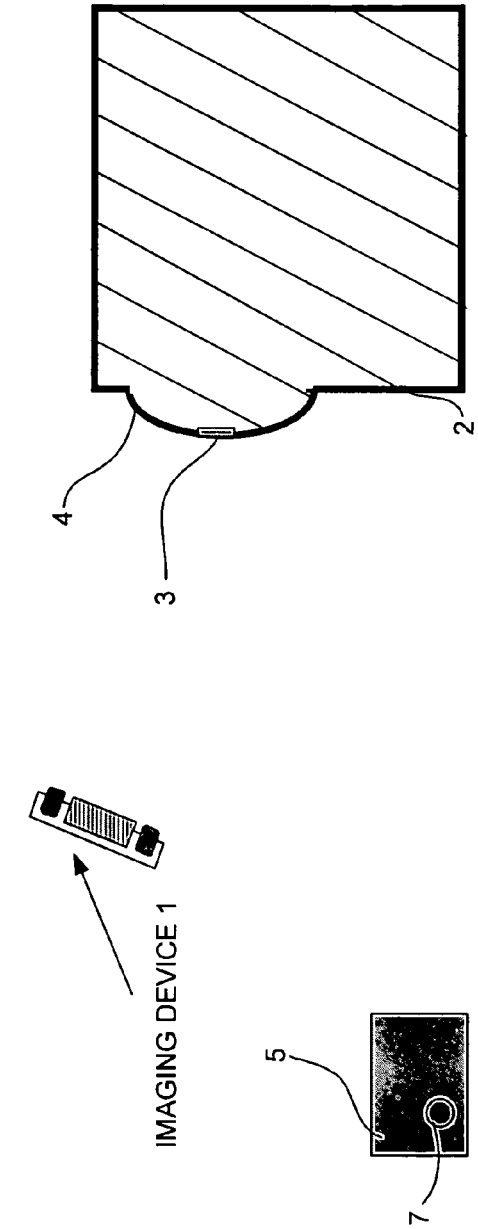

METHOD AND APPARATUS FOR DETERMINING SURFACE DISPLACEMENT BASED ON AN IMAGE OF A RETROREFLECTOR ATTACHED TO THE SURFACE

CROSS-REFERENCE TO RELATED APPLICATIONS

This application is a continuation-in-part and claims the benefit of the filing date of U.S. patent application to Fouquet et al. entitled "Method and system for wavelength-dependent imaging and detection using a hybrid filter", having application Ser. No. 10/739,831, filed on Dec. 18, 2003 now U.S. Pat. No. 7,217,913 and published on Jun. 23, 2005, and which is incorporated by reference herein in its entirety.

BACKGROUND OF THE INVENTION

A wide variety of systems exist for detecting and/or imaging an object of interest. Detecting an object of interest generally involves determining the absence or presence of the object, while imaging involves obtaining an electronic representation of the object based on light emanating or being reflected from the object. Additionally, often times there is value in monitoring the displacement of part of the surface of the object.

Wavelength-dependent imaging is one technique for imaging or detecting an object, and typically involves detecting one or more particular wavelengths that reflect off, or transmit through, the object. In some implementations, only solar or ambient illumination is required, while in other implementations additional illumination is needed. Light is transmitted through the atmosphere at many different wavelengths, including visible and non-visible wavelengths. Thus, the wavelengths of interest may not be visible.

When a light emitting diode (LED) or laser is used by the imaging system to illuminate the object of interest, the simultaneous presence of broad-spectrum solar radiation can make detecting light emitted from an LED or laser and reflected off an object quite challenging during the day. Solar radiation can dominate the detection system and render the relatively weak scatter from the light source small by comparison. Other ambient sources that emit radiation in the same waveband as the LED or laser may also cause such problems.

Additionally, the object being detected may not remain stationary during successive measurements. For example, if a human being is the object, the person may shift position or move during the time the measurements are taken. If measurements made at different wavelengths are made at different times, movement of the object during successive measurements can distort the measurements and render them useless.

A need exists for a way to accurately image an object to determine the surface displacement that overcomes the difficulties associated with the presence of ambient light and/or motion of the object.

SUMMARY OF THE INVENTION

The invention provides a system and method for determining displacement of retroreflectors attached to a surface of an object. In accordance with one embodiment, the system comprises at least one retroreflector located on a surface of the object of interest, a light source, an imaging device, and an image processing device. The imaging device is positioned at a generally fixed, line-of-sight position relative to the object. The imaging device receives light reflected by the retroreflector and converts the received light into electrical signals. The image processing device receives the electrical signals generated by the imaging device. The image processing device processes the electrical signals to determine changes in the position of the retroreflector. The image processing device interprets the changes in position into information relating to displacement of the surface on which the retroreflector is located.

The method of the invention comprises capturing an image of a retroreflector located on a surface of the object with an imaging device that is located at a generally fixed, line-of-sight location with respect to the retroreflector. The imaging device receives light reflected by the retroreflector and converts the received light into electrical signals. The electrical signals are processed to determine changes in the position of the retroreflector. The changes in position are interpreted into information relating to displacement of the surface on which the retroreflector is located.

The displacement of the surface may be used to determine a variety of different types of useful information, including, for example, the value of some physiological parameter of a patient, internal and external pressure of an object, acoustical vibrations sensed by a microphone, positions of fingertips on a keyboard, etc.

These and other features and aspects of the invention will become apparent from the following description, drawings and claims.

BRIEF DESCRIPTION OF THE DRAWINGS

FIGS. 7A and 7B illustrate a pictorial diagram that demonstrates the use of the invention to image an object to determine changes in pressure of the object.

DETAILED DESCRIPTION OF EXEMPLARY EMBODIMENTS

Figure 1:
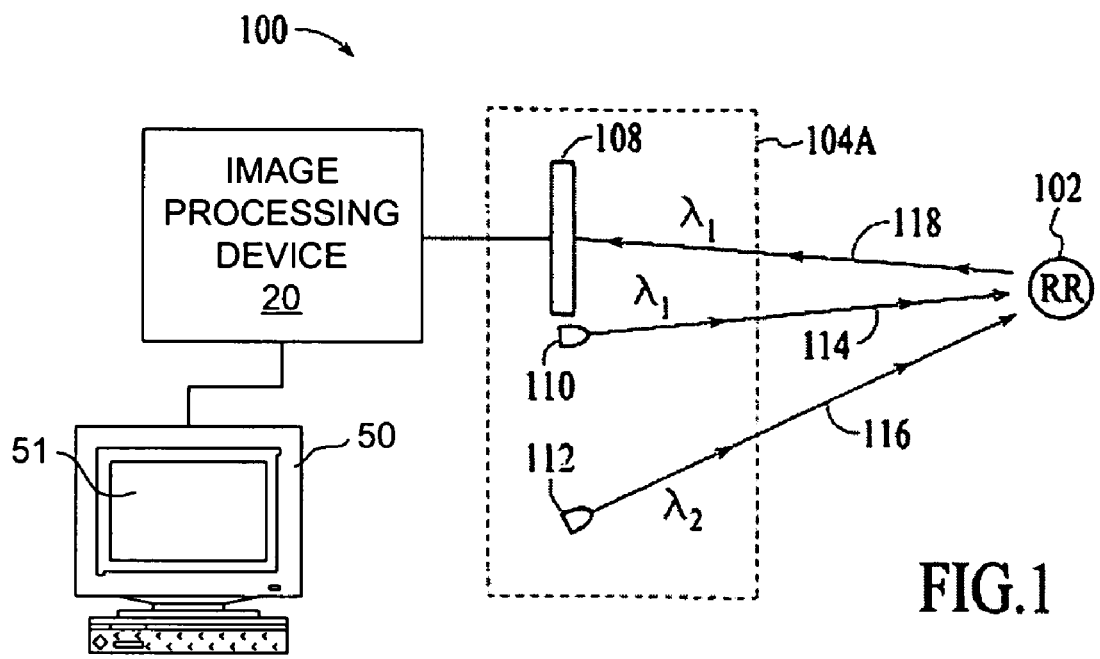
FIG. 1 depicts a system for generating position information that includes a retroreflector, an image collection system, and a processor.

In accordance with the invention an imaging technique is provided that uses imaging information relating to a retroreflector attached to a surface of an object of interest to determine the shape and/or displacement of the surface of the object. A variety of types of information may then be ascertained based on the determination as to the shape and/or displacement of the surface of the object. Examples of a few different imaging systems that are suitable for this purpose are described below with reference to FIGS. 1-6B. Prior to describing these exemplary imaging systems, the manner in which the shape and/or displacement of a surface of an object may be ascertained from image information acquired relating to a retroreflector attached to the surface will be described with reference to FIGS. 7A-10.

FIGS. 7A and 7B illustrate an object of interest 2 that is being monitored by an imaging device 1 for changes in pressure. FIG. 7A represents the situation in which the object 2 is at low pressure, whereas FIG. 7B represents the situation in which the object 2 is at high pressure. A retroreflector 3 is attached at a strategic location on a surface 4 of the object 2 such that detected movement of the retroreflector 3 corresponds to a change in the shape of the surface 4 or displacement of the surface 4.

With reference to FIG. 7A, the surface 4 is recessed into the object 2 when the pressure is low. In contrast, the surface 4 protrudes from the object 2 when the pressure is high. Because the imaging device 1 remains at a fixed location with respect to the position of the object 2, the position on the imaging device at which the image of the retroreflector 3 is formed changes as the shape of the surface 4 changes. Box 5 shown in FIGS. 7A and 7B represents a front view of a sensor array (e.g., an array of photosensors) of the imaging device 1 with respect to the object 2. With reference to FIG. 7A, the circular area 6 on the sensor array 5 corresponds to the image of the retroreflector 3 when the surface 4 is in the recessed position. With reference to FIG. 7B, the circular area 7 on the sensor array 5 corresponds to the image of the retroreflector 3 when the surface 4 is in the protruding position.

A comparison of images 6 and 7 formed on the sensor array 5 shown in FIGS. 7A and 7B, respectively, demonstrates that the location at which the image is formed on the sensor array 5 changes as the position of the retroreflector 3 changes. Thus, by examining the coordinates of the pixels in the sensor array 5 that correspond to the image of the retroreflector 3, a determination can easily be made as to the shape or displacement of the surface 4, and consequently, of the pressure of the object 2.

The pressure referred to above with reference to FIGS. 7A and 7B may be any type of fluid, i.e., air, other types of gases, or liquids. The surface 4 may be a membrane that is made of the same or a different type of material than that of which the object 2 is made. In addition, the surface 4 may be a retroreflector so that there is no need to attach a separate retroreflector to the object 2.

Figure 8:
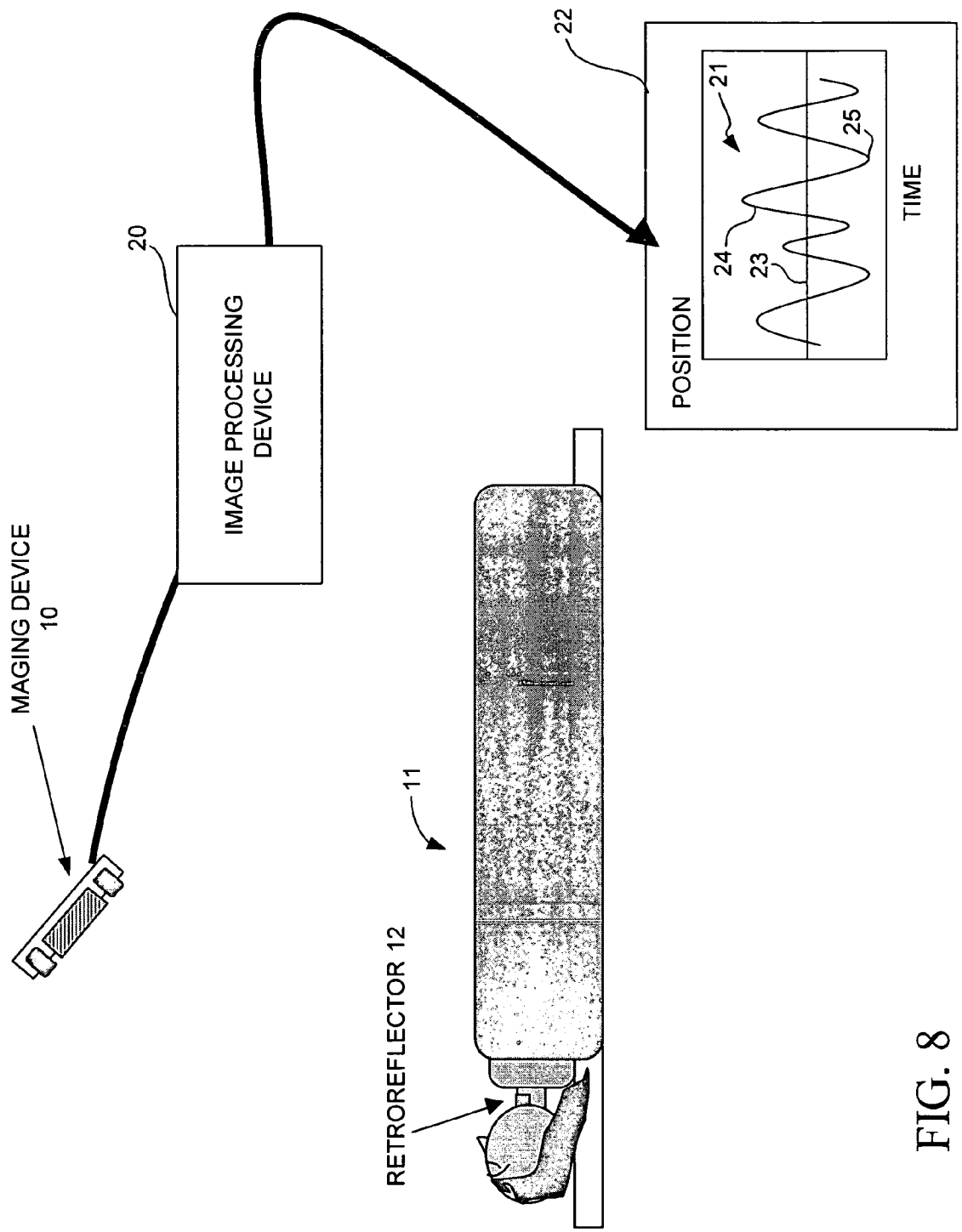
FIG. 8 illustrates a pictorial diagram that demonstrates the use of the invention to monitor the pulse rate of a person.

FIG. 8 illustrates a pictorial diagram of the use of the invention to monitor the pulse rate of a person 11. In this case, the membrane is the person's skin, and the retroreflector 12 is a patch placed on the person's neck region. The imaging device 10 is maintained at a fixed, line-of-sight position with respect to the retroreflector 12. The imaging device 10 converts the light that impinges on the sensor array (not shown) of the imaging device 10 into electrical signals, which are received by an image processing device 20. The image processing device 20 processes the electrical signals and produces a plot 21 of output signal as a function of time that may be displayed on a display monitor 22.

As shown in the plot 21, the output signal produced by the imaging processing device 20 varies as a function of time as the position of the retroreflector 12 changes in response to movements of the carotid artery of the person 11. The output signal produced by the imaging processing device 20 corresponds to the position of the image of the retroreflector 12 on the sensor array of the imaging device 10. The sensor array of the imaging device 10 is essentially an array of pixels, each of which has a position defined by a pair of X, Y Cartesian coordinates, although the positions could be defined by a different coordinate system, such as a polar coordinate system. Therefore, the vertical axis shown in the display 22 represents some type of relative position of the image of the retroreflector as a function of time.

The line 23 in the plot 21 corresponds to some baseline position of the retroreflector image, which may be determined during a calibration procedure. The point 24 in the plot 21 corresponds to an instant in time when the retroreflector 12 is far from its baseline position in one direction relative to the fixed imager. The point 25 in the plot 21 corresponds to an instant in time when the position of the retroreflector is far from its baseline position in the opposite direction. The other points on the curve correspond to times and positions of the retroreflector 12 in between the two extremes.

Figure 9:
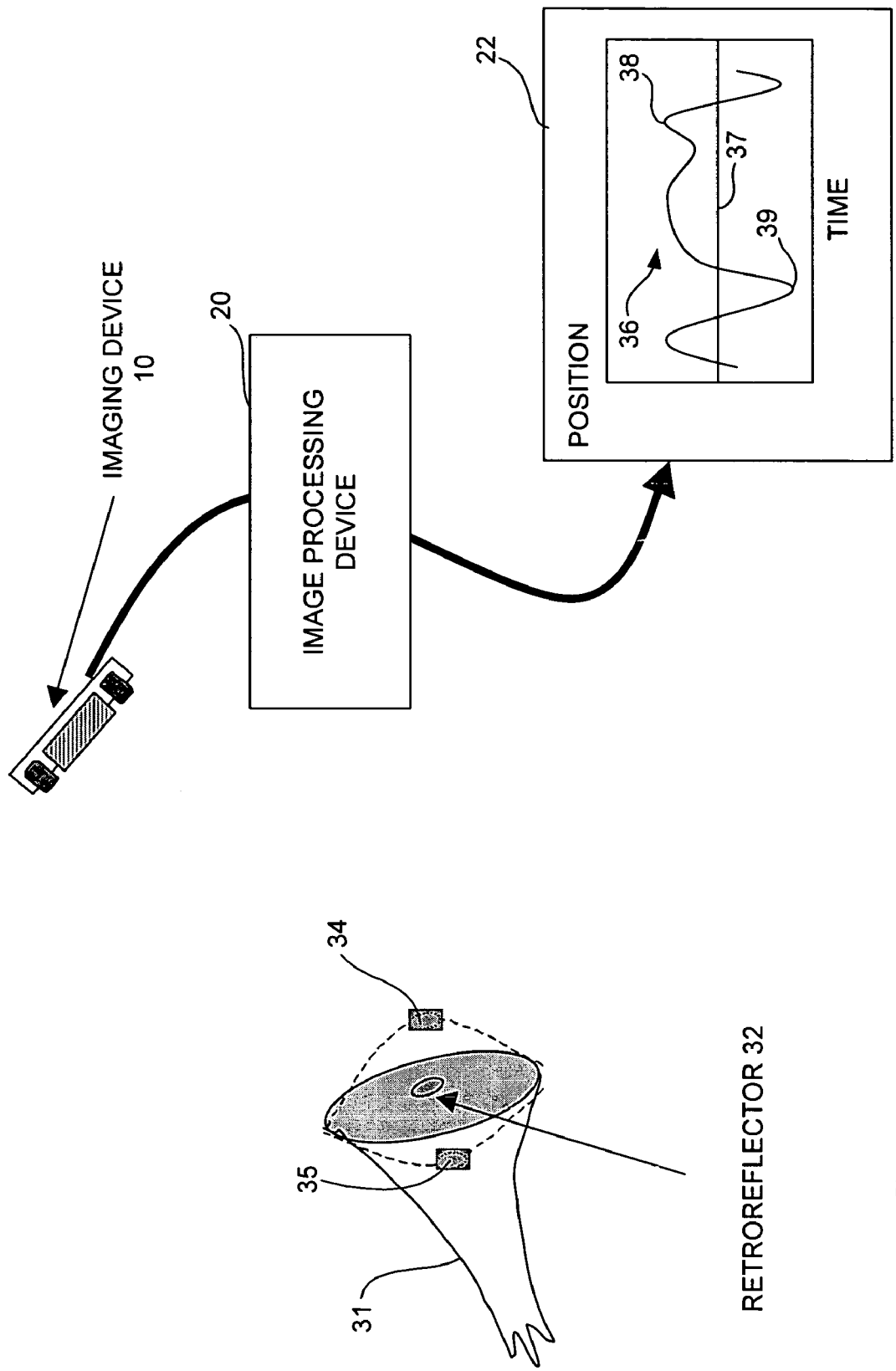
FIG. 9 illustrates a pictorial diagram that demonstrates the use of the invention as a microphone.

FIG. 9 illustrates a pictorial diagram that is similar to that shown in FIG. 8 except that a microphone 31 rather than a person is being monitored. The imaging device 10, the image processing device 20 and the display 22 may be the same as the components with like reference numerals shown in FIG. 8. In the embodiment shown in FIG. 9, the retroreflector 32 is placed on the microphone 31. The microphone 31 is surrounded by some other fluid (not shown), e.g., air. Vibrations in the fluid surrounding the microphone 31 cause the surface 33 on which the retroreflector 32 is placed to be displaced to positions that range between the extremes represented by reference numerals 34 and 35:

The line 37 in the plot 36 corresponds to some baseline position of the retroreflector image. The point 38 in the plot 21 corresponds to an instant in time when the retroreflector 32 is at the position represented by reference numeral 34. The point 39 in the plot 36 corresponds to an instant in time when the retroreflector 32 is is at the position represented by reference numeral 34. The other points on the curve correspond to times and positions of the retroreflector 32 in between the two extremes.

Figure 10:
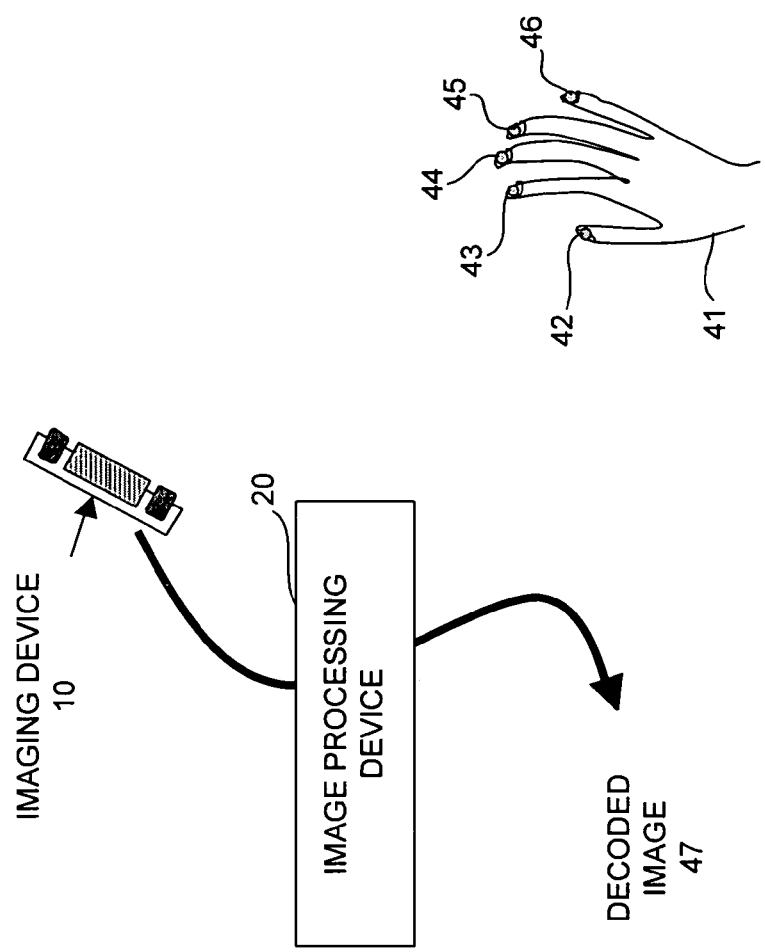
FIG. 10 illustrates a pictorial diagram that demonstrates the use of the invention to monitor the positions of fingertips of a person's right hand.

FIG. 10 illustrates a pictorial diagram of the invention being used to monitor the positions of fingertips of a person's right hand 41. In accordance with this embodiment, retroreflectors 42-46 are placed on the fingernails of the hand 21. The imaging device 10 is maintained in a fixed, line-of-sight position with respect to the hand 41. As the fingertips move, the respective images of the respective retroreflectors 41-46 formed on the sensor array of the imaging device 10 also change. The image processing device 20 processes the electrical signals generated by the imaging device 10 and produces a decoded image 47.

The embodiment illustrated in FIG. 10 is useful for many applications, including, for example, as an input device (e.g., a keyboard, mouse, etc.) to a computer (not shown). For example, rather than depressing keys on a keyboard in order to enter text into a computer, the location of each retroreflector 42-46 relative to a physically present or virtual keyboard is interpreted by the image processing device 20 as a particular letter, number, symbol or action. Other examples of the use of this embodiment of the invention are to convert sign language into text or speech. The locations of the retroreflectors 42-46 are decoded by the image processing device into the meaning being conveyed by sign. Subsequently, the signs may be converted by some other device (not shown) into text or speech. A variety of other applications are also possible, as will be understood by those skilled in the art in view of this description.

The embodiments described above with reference to FIGS. 7A-10 are merely examples of the manner in which the invention may be used. Having described a few examples of the invention, a few exemplary image processing systems and methods that are suitable for performing the imaging tasks described above will now be described with reference to FIGS. 1-6B.

FIG. 1 depicts a system 100 for generating position information that includes a retroreflector 102, an image collection system 104A, and an image processing device 20. In accordance with this embodiment, the image collection system includes an imager 108 and first and second light sources 110, 112 that output light 114, 116 having different wavelengths. The first light source 110 is located closer to the imager 108 than the second light source 112, and the two light sources and the imager 108 are located in the same plane. The first light source 110 is referred to herein as the "on-axis" light source and the second light source 112 is referred to herein as the "off-axis" light source. The terms "on-axis" and "off-axis" as used herein are described below with reference to FIGS. 2 and 3.

Figure 2:
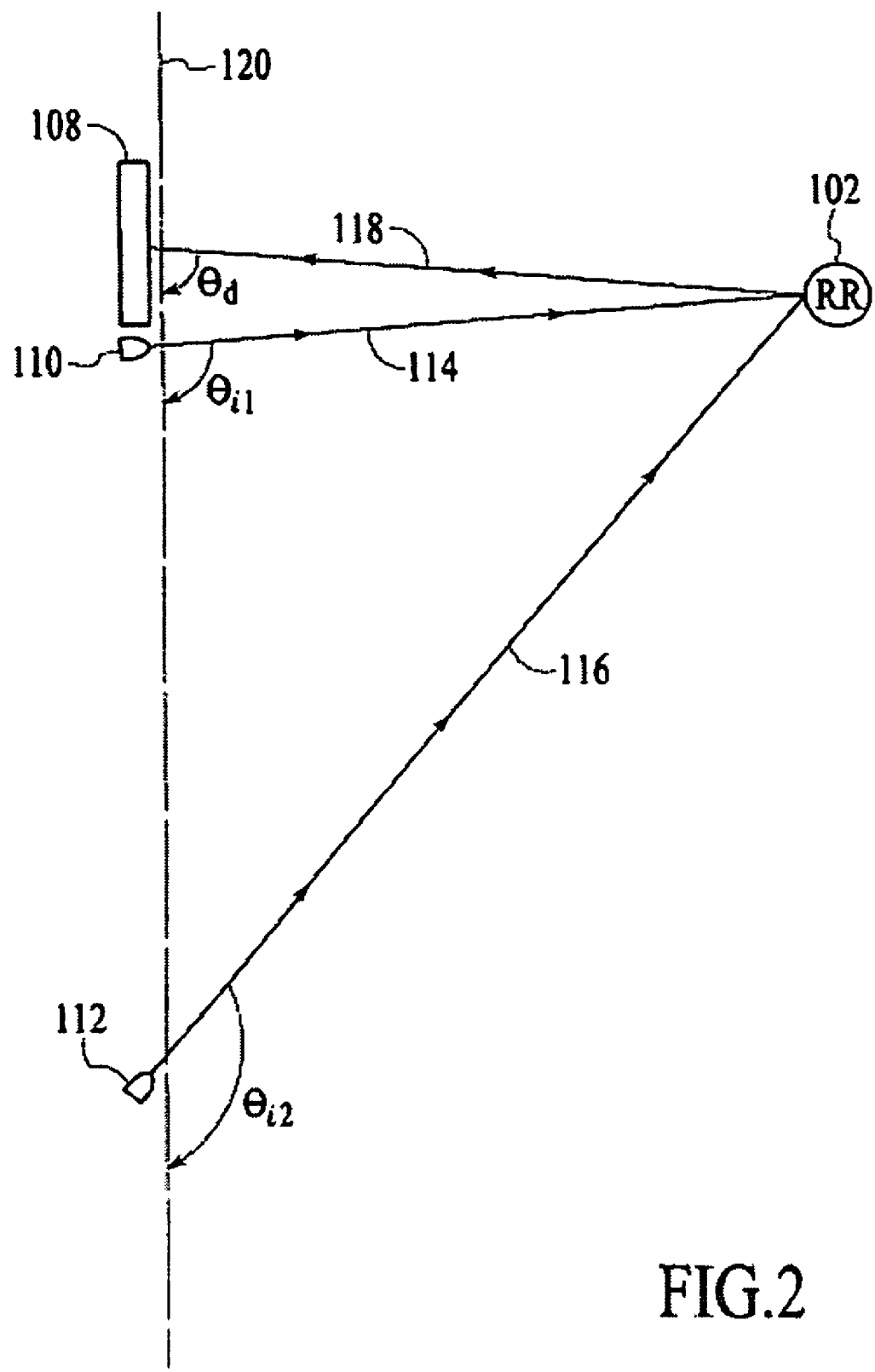
FIGS. 2 and 3 illustrate the detection angle, the on-axis illumination angle, and the off-axis illumination angle in the image collection system of FIG. 1.

The angle at which light from a light source illuminates the retroreflector 102 is referred to as the illumination angle. With reference to FIG. 2, the illumination angle is measured relative to a plane (as indicated by dashed line 120) that is coplanar with the plane of the major surface of the imager 108. The illumination angle of light source 110 is identified as $\theta_{i1}$ and the illumination angle of light source 112 is identified as $\theta_{i2}$. The angle at which light 118 reflected from the retroreflector is incident on the imager is referred to as the detection angle. The detection angle is identified as $\theta_d$ and is measured relative to the same plane as the illumination angle.

In the case of two illumination angles, $\theta_{i1}$ and $\theta_{i2}$, the term "on-axis" applies to the light source or the illuminating beam whose illumination angle has the smaller difference from the detection angle, $\theta_d$, and the term "off-axis" refers to the light source or the illumination beam whose illumination angle has the largest difference from the detection angle. Referring to FIG. 2, the relationship of the illumination and detection angles is mathematically expressed as: $|\theta_{i1}-\theta_d|<|\theta_{i2}-\theta_d|$.

Figure 3:
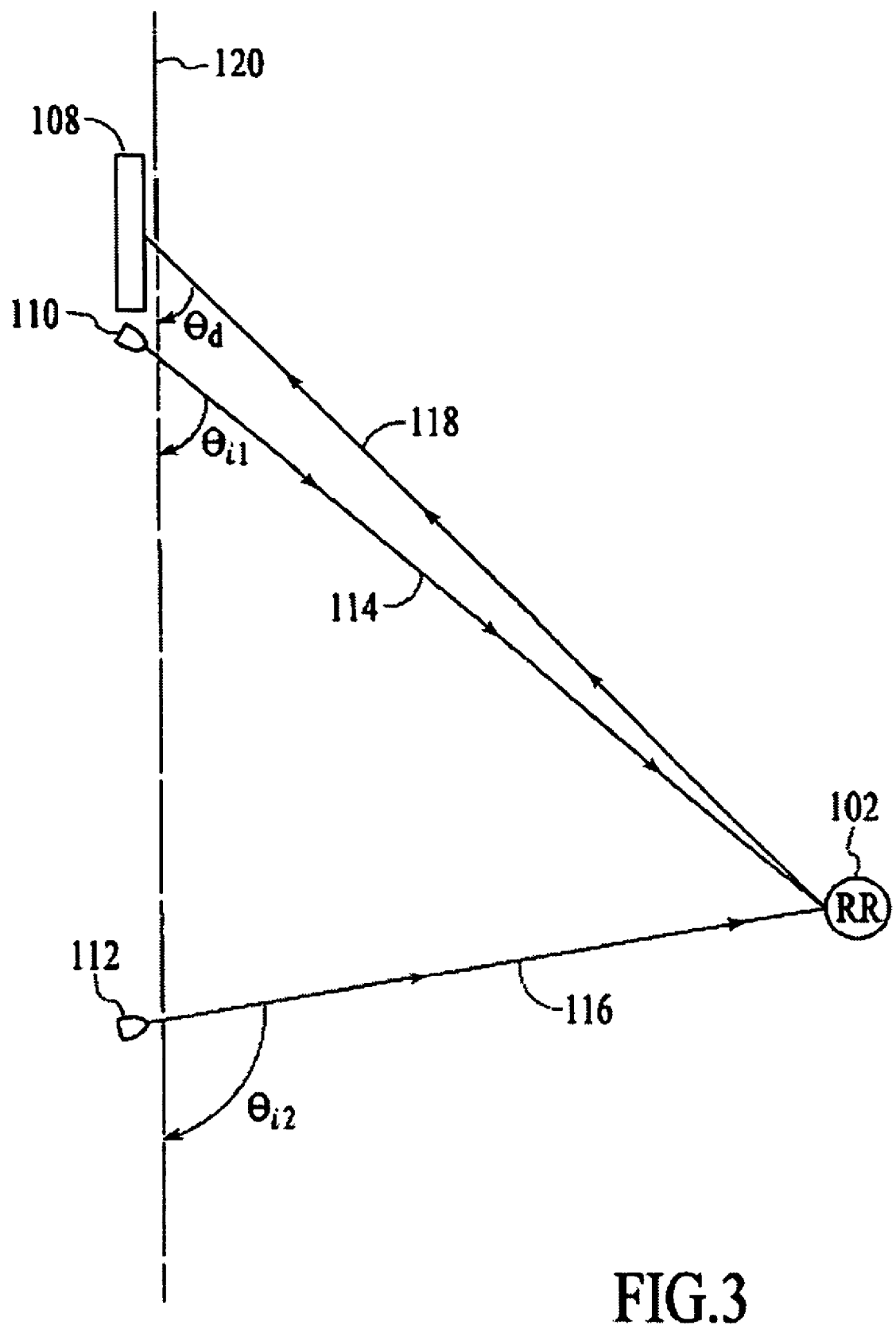

FIG. 3 illustrates changes in the illumination and detection angles that occur as the retroreflector 102 moves relative to the imager 108 and the two light sources 110, 112. Although the illumination and detection angles change as the retroreflector 102 moves, the difference between the on-axis illumination angle and the detection angle remains smaller than the difference between the off-axis illumination angle and the detection angle, $|\theta_{i1}-\theta_d|<|\theta_{i2}-\theta_d|$. Given this relationship between the illumination and detection angles, the status of a light source as an on-axis light source or an off-axis light source does not change with movement of the retroreflector. It should be noted that this relationship is still maintained when the retroreflector is moved in a direction having a component perpendicular to the plane of the figure.

With reference again to FIG. 1, the image collection system 104A is used to collect at least two sets of image data. The first set of image data is collected in response to light at wavelength λ1 generated by light source 110 and the second set of image data is collected in response to light of wavelength λ2 generated by light source 112. The first set of image data, referred to herein as the on-axis image data, is representative of light of wavelength λ1 that reflects off the retroreflector 102 and any other objects that are illuminated by light source 110. The second set of image data, referred to herein as the off-axis image data, is representative of light of wavelength λ2 that reflects off the retroreflector and any other objects that are illuminated by light source 112.

Because the on-axis illumination angle is closer to the detection angle than the off-axis illumination angle, the on-axis image data will include a stronger indication of the retroreflector 102 relative to the off-axis image data. In this case, the intensity of light reflected by the retroreflector 102 to the imager 108 will be much greater at wavelength λ1 than at wavelength λ2. Therefore, the intensity values at data points related to the retroreflector will be higher in the on-axis image data than at corresponding data points in the off-axis image data.

Figure 4:
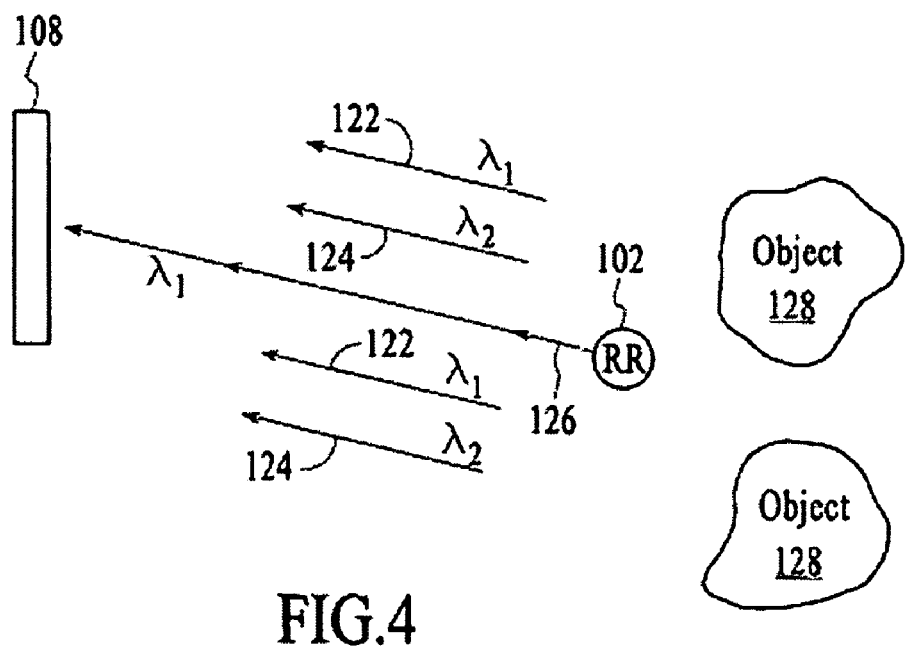
FIG. 4 depicts light of wavelength λ1 and wavelength λ2 that is incident on an imager after reflecting off of a retroreflector and any miscellaneous objects.

FIG. 4 depicts light 122, 124, 126 of wavelength λ1 and wavelength λ2 that is incident on the imager after reflecting off the retroreflector and other objects 128. While the intensity of light 126 reflected by the retroreflector 102 to the imager 108 will be much greater at wavelength λ1 than at wavelength λ2, the intensity of light 122, 124 reflected by the other objects will be roughly the same assuming that the intensity of the light emitted by the two light sources is roughly equal. The difference in the intensities of light that is reflected from the retroreflector 102 at the two wavelengths and imaged is used to generate position information, which is used in accordance with the invention to determine surface displacement.

Figure 5:
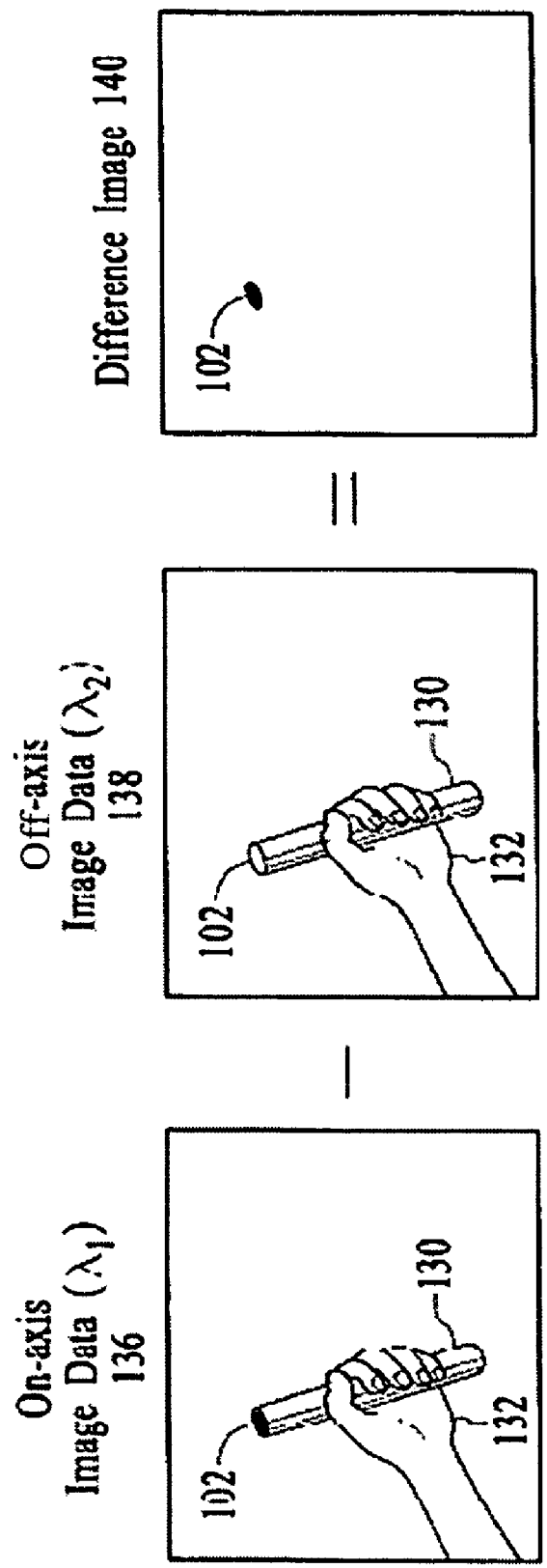
FIG. 5 illustrates the basic operation of the system of FIG. 1.

The basic operation of the system illustrated in FIG. 1 will now be described with reference to FIG. 5. In FIG. 5, a retroreflector 102 is connected to a pointing device 130 that is held in a hand 132. The hand, pointing device, and retroreflector are illuminated by light sources 110 and 112 shown in FIG. 1. On-axis and off-axis image data 136, 138 are collected by the imager 108 while the objects are illuminated by the respective light sources. As illustrated in FIG. 5, the on-axis image data 136 includes light that reflects off the hand, the pointing device, and the retroreflector. Because the illumination angle at wavelength λ1 and the detection angle are similar, the on-axis image data includes a strong indication of light from the retroreflector 102. The strong indication of light is represented in FIG. 5 by a dark spot.

The off-axis image data 138 also includes light that reflects off the hand, the pointing device, and the retroreflector. However, because the off-axis image data is obtained in response to off-axis light, the intensity of the off-axis light that reflects off the retroreflector towards the imager 108 is small compared to the intensity of the on-axis light that reflects off the retroreflector towards the imager. Therefore, in the off-axis image data, the retroreflector does not appear significantly brighter than any of the other objects.

In comparing the on-axis image data 136 to the off-axis image data 138, the only significant difference between the two data sets (assuming the data sets are captured simultaneously or nearly simultaneously) is the indication of the retroreflector 102. In view of this, the position of the retroreflector can be definitively identified by taking the difference between the two sets of image data to produce a difference image 140. Because most of the data points in the two sets of image data are the same, most of the corresponding data points will cancel each other out, with the one exception being the data points that correspond to the retroreflector. Therefore, the difference between the on-axis image data and off-axis image data gives a definitive indication of the position of the retroreflector. As depicted in FIG. 5, the difference image definitively identifies the retroreflector while excluding any of the other objects. Referring back to FIG. 1, the difference operation is carried out by the image processing device 20.

Because a difference function is relied upon to generate position information, it is important to generate two sets of image data that can be efficiently compared. In one embodiment, light detected by the imager is filtered to limit the detected light to wavelength bands around the wavelengths used for illumination. For example, when light of wavelengths λ1 and λ2 is used for illumination, a bulk filter with transmission peaks at wavelengths λ1 and λ2 can be located in front of the imager to filter out light of other wavelengths (e.g., ambient light).

With the embodiment of the imaging system described above with reference to FIGS. 1-5, it is important that if the on-axis and off-axis images are captured at different instants in time, these instants should be very close in time to each other. If the images are not captured at instants in time that are very close, motion of the object may result in the difference image not being capable of being used to precisely determine the position of the retroreflector. Consequently, the displacement of the surface on which the retroreflector is placed may not be precisely determined. Depending on the speed of motion of the surface, this may be a major or a minor limitation.

An alternative to using the imaging system described above with reference to FIGS. 1-5 is to use an imaging system having an imager that is configured to distinguish between the two wavelengths of light used for illumination, which makes it possible to capture the on-axis and off-axis images simultaneously, thus ensuring that motion of the object will not be an issue when determining displacement of the retroreflector from the difference image.

An example of a hybrid filter for an imager that includes a bulk filter with two peaks and a checkerboard filter pattern is described in a U.S. patent application to Fouquet et al. entitled "Method and system for wavelength-dependent imaging and detection using a hybrid filter," having application Ser. No. 10/739,831, filed on Dec. 18, 2003 and published on Jun. 23, 2005, and which is incorporated by reference herein in its entirety. By substituting the imager 108 shown in FIG. 1 with the imager disclosed in Fouquet et al., the images to be difference may be obtained effectively simultaneously, i.e., within a single frame. The on-axis and off-axis images derived from the two sub-frames formed by the checkerboard filter are then subtracted by the image processing device 20 to obtain the difference image in the manner described above with reference to FIG. 1.

The image processing device 20 is configured to process the difference image to determine the position of the retroreflector, from which the image processing device 20 determines the extent of displacement of the surface upon which the retroreflector is located. Displacement is simply the difference between a first position of the retroreflector and a second position of the retroreflector. Therefore, the image processing device 20 determines displacement by processing a first difference image to obtain coordinates corresponding to a first position of the retroreflector, processing a subsequent position of the retroreflector to obtain coordinates corresponding to a second position of the retroreflector, and then subtracting the first position coordinates from the second position coordinates to obtain the displacement.

For example, assuming X1, Y1 corresponds to the coordinate pair for the first position and X2, Y2 corresponds to the coordinate pair for the second position, the displacement in the Y direction is determined as (Y2−Y1)=Y21, and the displacement in the X direction can be determined as (X2−X1)=X21. An alternative to determining displacement by calculating changes between positions of the retroreflector is to calculate changes in the retroreflector position relative to some fixed reference point (e.g., top right corner, center, etc.) on the imager itself, and therefore relative to the corresponding fixed point in the system's field of view.

The image processing device 20 may be any type of processor, including, for example, a microprocessor or microcontroller programmed with software to perform the functions described above, and hardware comprising a combination of logic gates configured to perform these functions. Thus, the displacement determination may be performed in software, hardware, or in a combination of software (or firmware) and hardware. The term "processing device" will be used herein to denote all such implementations.

It should be noted that some of the tasks described above as being performed by the image processing device 20 may be offloaded to another processor (not shown) or computer. For example, the image processing device 20 will typically perform the retroreflector position calculations, but a different processing device may receive the position calculations and perform the other calculations, such as converting the position information into surface displacement information and then converting the surface displacement information into some other type of information, e.g., pulse rate, pressure, etc.

For example, FIG. 1 illustrates a computer 50 in communication with the image processing device 20 for receiving the displacement information from the image processing device 20 and for converting it into some other type of information, e.g., physiology information, acoustical information, pressure information, etc. This information may then be displayed on a display monitor 51, or printed out by a printer (not shown). However, all of these processing tasks may be performed by the single image processing device 20.

Figure 6A:
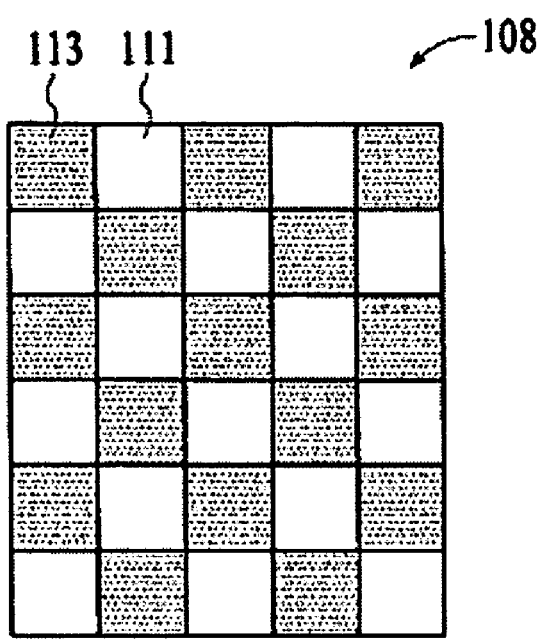
FIG. 6A depicts a top view of an imager that includes a checkerboard filter pattern.
Figure 6B:
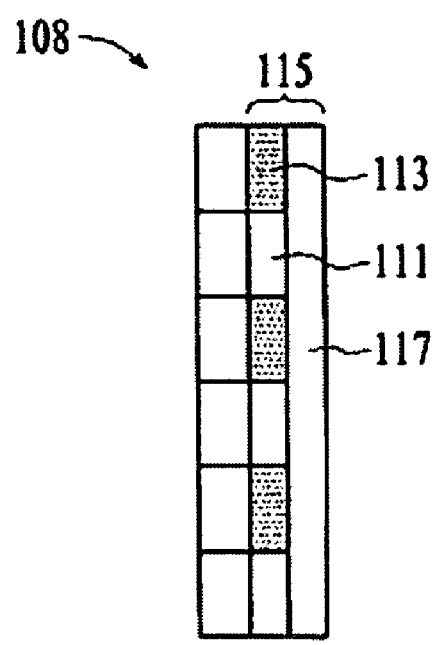
FIG. 6B depicts a side view of the imager from FIG. 6A with a hybrid filter over the imager.

FIG. 6A depicts a top view of imager 108 that includes a checkerboard filter pattern of the type disclosed in Fouquet et al. In the embodiment shown in FIG. 6A, some imager pixels are covered by filters 111 (represented by the light squares) that pass light at wavelength λ1 and the other imager pixels are covered by filters 113 (represented by the dark squares) that pass light at wavelength λ2. FIG. 6B depicts a side view of the imager from FIG. 6A with a hybrid filter 115 located in front of the imager. The hybrid filter includes a bulk filter 117 and the wavelength-selective filters 111, 113.

In another embodiment, only one set of squares (e.g., either the light or dark squares) includes a wavelength-selective filter. Using a hybrid filter, the imager can simultaneously generate the two sets of image data while the retroreflector is illuminated by reflected light from both light sources.

Alternatively, the two sets of image data can be collected sequentially. For example, the imager and light sources can be coordinated so a first set of image data is collected while only the first light source is activated and the second set of image data is collected while only the second light source is activated. The sequential activation of light sources and collection of the image data can be controlled by the processor. Although one example of sequentially collecting the two sets of image data is described, other sequential collection techniques are possible.

Although the two sets of image data essentially cancel each other out in all areas except at the retroreflector, there are usually small differences in light intensity at the non-retroreflector data points. These intensity differences are insignificant in comparison to the intensity differences at the data points that correspond to the retroreflector. However, the difference processing may include utilizing a threshold function to eliminate insignificant data points.

Although the hybrid filter imaging technique described above with reference to FIGS. 1, 6A and 6B uses two different light sources 110 and 112 at on-axis and off-axis locations, both sources could be located on-axis. In this case, the aforementioned hybrid filter design (with half the pixels clear and half the pixels filtered) would be used, along with a separate bulk blocking filter (not shown) over the retroreflector itself, such that whichever wavelength the checkerboard dye filter passes would be blocked at locations on the imager that correspond to the positions of the retroreflector. In this all on-axis case the difference image is simply the difference between two on-axis images.

Another variation of the hybrid filter imaging technique described above with reference to FIGS. 1, 6A and 6B which uses two different light sources 110 and 112 is to use a single light source that generates multiple wavelengths.

It should be noted that the invention has been described with reference to exemplary embodiments and that the invention is not limited to the embodiments described herein. Those skilled in the art will understand the manner in which the embodiments described herein may be modified, and that all such modifications are within the scope of the invention.

What is claimed is:

1. A system for generating information relating to displacement of a surface of an object of interest, the system comprising:
    at least one retroreflector located on a surface of the object of interest;
    a first light source for producing light of a first wavelength, the first light source positioned at a first position on an axis;
    a second light source for producing light of a second wavelength, the second light source positioned at a second position on the axis;
    an imaging device positioned at a generally fixed, line-of-sight position relative to the object, the imaging device positioned substantially on the axis at a third position, wherein a distance between the third position and the first position is less than a distance between the third position and the second position, the imaging device receiving light of the first and second wavelengths reflected by said at least one retroreflector and by the object and converting the received light into a first set of electrical signals corresponding to the reflected light of the first wavelength and a second set of electrical signals corresponding to the reflected light of the second wavelength; and
    an image processing device, the image processing device receiving the first and second sets of electrical signals generated by the imaging device, the image processing device producing image difference information representing a difference between at least one image represented by the first set of electrical signals and at least one corresponding image represented by the second set of electrical signals, the image processing device processing the image difference information to determine changes in the position of the retroreflector, the image processing device interpreting the changes in position of said at least one retroreflector into information relating to displacement of the surface on which said at least one retroreflector is located.

2. The system of claim 1, wherein the image processing device determines the surface displacement by determining a first position of said at least one retroreflector based on the first and second sets of electrical signals and a second position of said at least one retroreflector based on the first and second sets of electrical signals and calculating a difference between the first and second positions of said at least one retroreflector.

3. The system of claim 2, wherein the image processing device determines the surface displacement by calculating a difference between a position of a generally fixed reference point within a field of view and the retroreflector position.

4. The system of claim 2, wherein the object is a person and said surface is a surface on the person's body, and wherein the image processing device interprets the displacement of the surface into information relating to physiology of the person.

5. The system of claim 2, wherein the object has an internal pressure, and wherein the image processing device interprets the displacement of the surface into information relating to the internal pressure of the object.

6. The system of claim 2, wherein the object is subject to an external pressure, and wherein the image processing device interprets the displacement of the surface into information relating to the external pressure acting on the object.

7. The system of claim 2, wherein the object is a microphone that senses acoustic vibrations in a medium surrounding the microphone, and wherein the image processing device interprets the displacement of the surface into acoustical information.

8. The system of claim 2, further comprising:
    a computer in communication with the image processing device, the computer receiving and processing the information relating to the displacement of the surface to translate the information relating to the displacement of the surface into information describing one or more conditions of the object.

9. The system of claim 8, wherein the object is a person and said surface is a surface on the person's body, and wherein the information describing one or more conditions of the object is information relating to physiology of the person.

10. The system of claim 8, wherein the object has an internal pressure, and wherein the information describing one or more conditions of the object is information relating to the internal pressure of the object.

11. The system of claim 8, wherein the object is subject to an external pressure, and wherein the information describing one or more conditions of the object is information relating to the external pressure acting on the object.

12. The system of claim 8, wherein the object is a microphone and wherein said information describing one or more conditions of the object is acoustical information.

13. The system of claim 8, wherein the system comprises multiple retroreflectors located on different surfaces of the object, and wherein the computer determines changes in the positions of the retroreflectors relative to one another based on light of the first and second wavelengths reflected by the retroreflectors and converted by the imaging device into first and second sets of electrical signals, respectively.

14. The system of claim 13, wherein the object is a hand and each retroreflector is located on a fingertip of the hand, and wherein the computer translates the changes in the positions of each retroreflector into locations of the fingertips on a keyboard.

15. A method for determining a displacement of at least one retroreflector located on a surface of the object, the method comprising:
    illuminating an object having at least one retroreflector located on a surface thereof with at least first and second wavelengths of light, light of the first wavelength emanating from a first light source positioned at a first position on an axis, and light of the second wavelength emanating from a second light source positioned at a second position on the axis;
    capturing an image of said at least one retroreflector located on the surface of the object with an imaging device that is located at a generally fixed, line-of sight location with respect to said at least one retroreflector, the imaging device positioned substantially on the axis at a third position, wherein a distance between the third position and the first position is less than a distance between the third position and the second position, the imaging device receiving light of the first and second wavelengths reflected by said the retroreflector and by the object and converting the received light into a first set of electrical signals corresponding to the received light of the first wavelength and a second set of electrical signals corresponding to the received light of the second wavelength;

producing image difference information representing a difference between at least one image represented by the first set of electrical signals and at least one corresponding image represented by the second set of electrical signals;

processing the image difference information to determine changes in the position of said at least one retroreflector; and interpreting the changes in position into information relating to displacement of the surface on which said at least one retroreflector is located.

16. The method of claim 15, wherein the image processing determines the surface displacement by determining a first position of the retroreflector based on the first and second sets of electrical signals and a second position of the retroreflector based on the first and second sets of electrical signals and calculating a difference between the first and second positions of said at least one retroreflector.

17. The method of claim 16, wherein the image processing determines the surface displacement by calculating a difference between a position of a generally fixed reference point on the object and said at least one retroreflector position.

18. The method of claim 16, wherein the object is a person and said surface is a surface on the person's body, the method further comprising:
interpreting the displacement of the surface into information relating to physiology of the person.

19. The method of claim 16, wherein the object has an internal pressure, the method further comprising:
interpreting the displacement of the surface into information relating to the internal pressure of the object.

20. The method of claim 16, wherein the object is subject to an external pressure, the method further comprising:
interpreting the displacement of the surface into information relating to the external pressure acting on the object.

21. The method of claim 16, wherein the object is a microphone that senses acoustic vibrations in a medium surrounding the microphone, the method further comprising:
interpreting the displacement of the surface into acoustical information.

22. The method of claim 16, wherein the object is a hand and said at least one retroreflector is a separate retroreflector located on each fingertip of the hand, the method further comprising:
interpreting changes in the positions of each of the retroreflectors relative to one another into locations of the fingertips on a physical or virtual keyboard.

* * * * *

UNITED STATES PATENT AND TRADEMARK OFFICE
CERTIFICATE OF CORRECTION

| | |
|---|---|
| PATENT NO. | : 7,450,250 B2 |
| APPLICATION NO. | : 11/247894 |
| DATED | : November 11, 2008 |
| INVENTOR(S) | : Shalini Venkatesh et al. |

It is certified that error appears in the above-identified patent and that said Letters Patent is hereby corrected as shown below:

In the Specifications:

Column 1, Line 7, delete "APPLICATIONS" and insert -- APPLICATION --;

In the Claims:

Column 10, Line 60, Claim 15, delete "line-of sight" and insert -- line-of-sight --.

Signed and Sealed this

Twenty-sixth Day of October, 2010

David J. Kappos
*Director of the United States Patent and Trademark Office*